US011242495B1

(12) United States Patent
Tharpe, Jr.

(10) Patent No.: US 11,242,495 B1
(45) Date of Patent: Feb. 8, 2022

(54) PYROLYSIS OIL COMPOSITION DERIVED FROM BIOMASS AND PETROLEUM FEEDSTOCK AND RELATED SYSTEMS AND METHODS

(71) Applicant: Johnny Marion Tharpe, Jr., Albany, GA (US)

(72) Inventor: Johnny Marion Tharpe, Jr., Albany, GA (US)

(*) Notice: Subject to any disclaimer, the term of this patent is extended or adjusted under 35 U.S.C. 154(b) by 0 days.

(21) Appl. No.: 15/241,321

(22) Filed: Aug. 19, 2016

Related U.S. Application Data

(62) Division of application No. 13/794,951, filed on Mar. 12, 2013, now Pat. No. 9,447,325.

(51) Int. Cl.
| C10B 49/02 | (2006.01) |
| C10B 49/00 | (2006.01) |
| C10L 1/02 | (2006.01) |

(52) U.S. Cl.
CPC ......... *C10L 1/02* (2013.01); *C10L 2200/0469* (2013.01)

(58) Field of Classification Search
CPC combination set(s) only.
See application file for complete search history.

(56) References Cited

U.S. PATENT DOCUMENTS

| 4,326,382 A | 4/1982 | Baardson |
| 4,414,813 A | 11/1983 | Knapp |
| 4,431,405 A | 2/1984 | Eatherton |
| 4,638,629 A | 1/1987 | Archer et al. |
| 5,341,637 A | 8/1994 | Hamrick |
| 5,471,937 A | 12/1995 | Kosky et al. |
| 5,513,444 A | 5/1996 | Lindberg |
| 5,626,638 A | 5/1997 | Valkanas |

(Continued)

FOREIGN PATENT DOCUMENTS

| CA | 2441692 | 3/2005 |
| DE | 4342165 | 5/1995 |

(Continued)

OTHER PUBLICATIONS

Shaddix et al., for Sandia National Laboratories, Combustion Properties of Biomass Flash Pyrolysis Oils: Final Project Report, Sandia Report, Apr. 1999, Albuquerque, New Mexico 87185 and Livermore, California 94550.

(Continued)

*Primary Examiner* — Ellen M McAvoy
*Assistant Examiner* — Chantel L Graham
(74) *Attorney, Agent, or Firm* — Allen, Dyer, Doppelt & Gilchrist, P.A.

(57) ABSTRACT

A pyrolysis oil composition that is soluble in hydrocarbon fuel, and related systems and methods for making the composition, are described. In an exemplary embodiment, a process for making a pyrolysis oil composition involves pyrolyzing biomass to generate biomass-derived pyrolysis vapor therefrom, vaporizing petroleum feedstock to generate petroleum feedstock-derived vapor therefrom, blending the biomass-derived pyrolysis vapor and petroleum feedstock-derived vapor together, condensing the blended biomass-derived pyrolysis vapor and petroleum feedstock-derived vapor simultaneously to form a condensate, and collecting the condensate.

4 Claims, 7 Drawing Sheets

(56) References Cited

U.S. PATENT DOCUMENTS

| | | | |
|---|---|---|---|
| 5,666,890 | A | 9/1997 | Craig |
| 6,336,265 | B1 | 1/2002 | Niedermair |
| 7,272,934 | B2 | 9/2007 | Chandran et al. |
| 7,819,930 | B2 | 10/2010 | Adams et al. |
| 7,905,990 | B2 * | 3/2011 | Freel ................ C10B 49/22 201/12 |
| 8,206,471 | B1 | 6/2012 | Tharpe, Jr. |
| 8,314,275 | B2 | 11/2012 | Brandvold |
| 8,353,973 | B2 | 1/2013 | Tharpe, Jr. |
| 2004/0020207 | A1 | 2/2004 | Thiessen |
| 2006/0000701 | A1 | 1/2006 | Smith et al. |
| 2006/0101663 | A1 | 5/2006 | Perin et al. |
| 2006/0225424 | A1 | 10/2006 | Elliott et al. |
| 2006/0254081 | A1 | 11/2006 | Carin et al. |
| 2009/0139851 | A1 | 6/2009 | Freel |
| 2012/0160741 | A1 * | 6/2012 | Gong ................ C10G 1/002 208/113 |
| 2013/0145683 | A1 * | 6/2013 | Freel ................ C10L 1/1802 44/307 |
| 2015/0005547 | A1 * | 1/2015 | Freel ................ C10L 1/04 585/14 |

FOREIGN PATENT DOCUMENTS

| | | |
|---|---|---|
| DE | 19729585 | 10/1998 |
| EP | 0165839 | 12/1985 |
| JP | 8049822 | 2/1996 |
| WO | 2007113330 | 10/2007 |

OTHER PUBLICATIONS

Chiaramonti D., Riccio G. et al., Sprays of Biomass Pyrolysis Oil Emulsions: Modeling and Experimental Investigation. Preliminary results and modeling, Proceeding of the 14th European Biomass Conference & Expedition, Paris, 2005.

Jones et al., for the U.S. Department of Energy, Production of Gasoline and Diesel from Biomass via Fast Pyrolysis, Hydrotreating and Hydrocracking: A Design Case, Feb. 2009.

Jamil et al., Production of Pyrolytic Oil from Maize Stalk, International Journal of Chemical and Environmental Engineering, Apr. 2011, vol. 2, No. 2.

Washington State Department of Ecology, Methods for Producing Biochar and Advanced Biofuels in Washington State, Ecology Publication No. 11-07-017, Apr. 2011.

* cited by examiner

PYROLYSIS OIL COMPOSITION DERIVED FROM BIOMASS AND PETROLEUM FEEDSTOCK AND RELATED SYSTEMS AND METHODS

CROSS-REFERENCE TO RELATED APPLICATIONS

This application is a divisional of U.S. application Ser. No. 13/794,951 filed on Mar. 12, 2013, the contents of which application are herein incorporated by reference in its entirety.

FIELD OF THE INVENTION

The invention relates to the field of pyrolysis oil derived from biomass and, more particularly, to a pyrolysis oil composition and processes for making a pyrolysis oil composition that is miscible with hydrocarbon fuel.

BACKGROUND

For the past several years, there has been a significant amount of effort directed to converting biomass to fuels and other useful chemicals. This is due in large part to the rising cost of crude oil, motivating researchers to seek alternative sources of hydrocarbons.

A chemical processing technique that has long been used to convert biomass into a useful product is called fast, or rapid, pyrolysis. Rapid pyrolysis is the thermal decomposition of carbonaceous material or biomass, over just a few seconds, in the absence of oxygen to produce char, pyrolysis oil, and non-condensing gases (NCGs). Pyrolysis oil derived from plant material such as wood, is a complex mixture of hydrocarbons, oxygenated compounds, and water.

Unfortunately, this kind of pyrolysis oil is not miscible with any conventional hydrocarbon based fuels unless it is further treated in a process called "upgrading." The upgrading process involves contacting the pyrolysis oil with hydrogen, under pressure and heat, to de-oxygenize, de-carboxylate, and de-water it. Only after it is upgraded may it then be further processed into conventional hydrocarbon fuels.

Logically, any energy or cost efficiencies provided by using pyrolysis oil is reduced by the amount of energy and time required to process the pyrolysis oil before it can be used. Accordingly, it would be beneficial to be able to skip the upgrading process.

One solution to this problem is to make the pyrolysis oil soluble in hydrocarbon based fuel by creating an emulsion, which involves adding a chemical called an emulsifier. While emulsifying the mixture is useful, it is still not ideal as it involves adding chemicals into the mixture that may interfere with its use.

SUMMARY

The various aspects of the invention solve these problems by providing a pyrolysis oil composition that is miscible with hydrocarbon fuel even without being upgraded or treated with an emulsifier. The pyrolysis oil composition is made by combining biomass-derived pyrolysis oil vapor with petroleum feedstock-derived vapor and condensing the vapors together to form a condensate that includes a mixture of biomass-derived pyrolysis oil and petroleum feedstock-derived oil.

A method, according to an embodiment of the invention that is useful to make this pyrolysis oil composition involves pyrolyzing biomass to generate biomass-derived pyrolysis vapor therefrom and vaporizing petroleum feedstock to generate petroleum feedstock-derived vapor therefrom. These vapors are blended together and condensed to form the condensate, which is collected.

Another method, according to an embodiment of the invention, which is useful to make the pyrolysis oil composition involves combining biomass and petroleum feedstock together to form a biomass/petroleum feedstock blend and pyrolyzing the biomass/petroleum feedstock blend to generate biomass-derived pyrolysis vapor and petroleum feedstock derived pyrolysis vapor. These vapors are then condensed to form pyrolysis oil, which is collected.

These aspects of the invention, along with other additional aspects, embodiments, and features will be better understood by referring to the accompanying drawings and the Detailed Description of Preferred Embodiments.

DETAILED DESCRIPTION OF PREFERRED EMBODIMENTS

Figure 1:
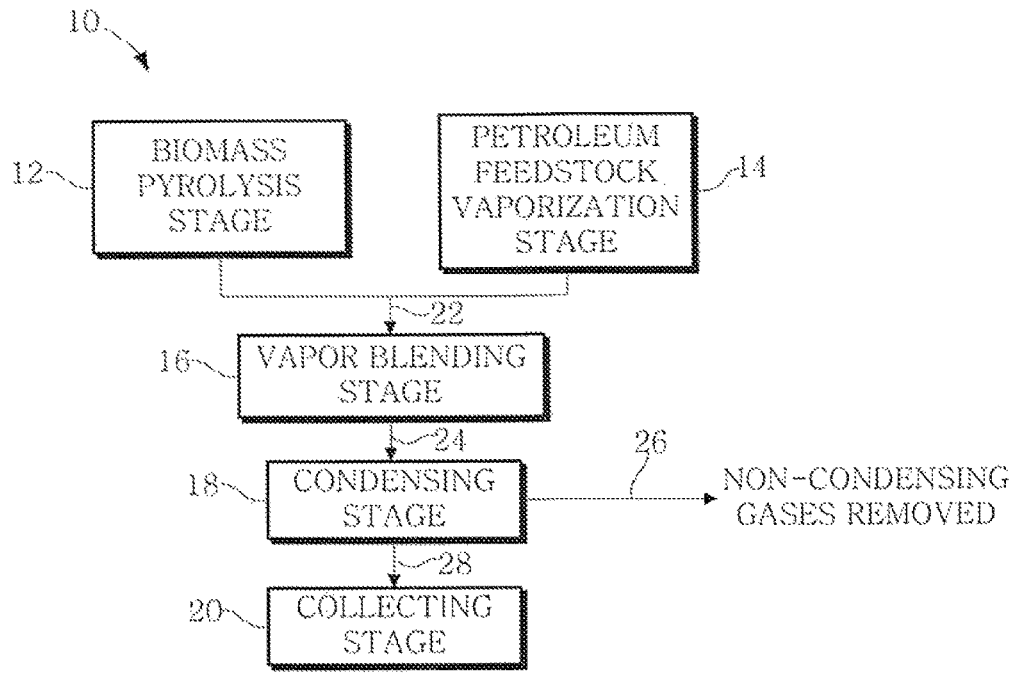
FIG. 1 is a schematic of a first pyrolysis system for producing the pyrolysis oil composition, according to an embodiment of the invention.

In the Summary above and in the Detailed Description of Preferred Embodiments, reference is made to particular features (including method steps) of the invention. Where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other ingredients, features, steps, etc. are optionally present. When reference is made herein to a method comprising two or more defined steps, the steps can be carried in any order or simultaneously (except where the context excludes that possibility), and the method can include one or more steps which are carried out before any of the defined steps, between two of the defined steps, or after all of the defined steps (except where the context excludes that possibility).

In this section, the invention will be described more fully with reference to certain preferred embodiments. This invention may, however, be embodied in many different forms and should not be construed as limited to the embodiments set forth herein. Rather, these embodiments are provided so that this disclosure will convey preferred embodiments of the invention to those skilled in the art.

One of the aspects of the invention is a pyrolysis oil composition that includes a mixture of biomass-derived pyrolysis oil and petroleum feedstock-derived oil coexisting in the same chemical phase. In this case, the two different oils are miscible in one another without needing to introduce any other chemical additives such as surfactants or emulsifiers.

One of the particularly advantageous properties of the pyrolysis oil composition is that it is miscible with hydrocarbon based fuel(s). Accordingly, the pyrolysis oil composition may be blended with hydrocarbon based fuel to form a pyrolysis oil composition in which the hydrocarbon based fuel coexists in the same chemical phase as well, without the need to treat it via the upgrading process or add an emulsifier beforehand. Preferred hydrocarbon fuels include gasoline and diesel fuel, for example.

As used here, the term "biomass" means biological material derived from living or recently living organisms, such as plants or plant-derived materials. Biomass includes cellulosic materials such as wood or wood products. Biomass may be supplied in the form of bulk or particulate matter. In the case of wood, for example, it may be in the form of wood chips, sawdust, bark, wood shavings, paper, or the like.

When used in the system and method aspects of the invention the biomass is preferably in the form of particulate matter. Accordingly, it may be desirable to grind the biomass to the desired particle size before pyrolyzing it. Although the size of the particulate matter is not necessarily limiting, good results have been obtained when the sides of the particulate matter are less than about one-quarter inch in length. In many cases, however, it is noteworthy that items of biomass having substantially larger dimensions may be used.

In certain embodiments, the biomass used in the system and/or method aspects of the invention is received from a wood processing plant such as a sawmill, particularly a CNS facility. Biomass received from such a facility does not typically need to be ground to a smaller size.

The biomass used in the system and method aspects of the invention preferably has a moisture content of about 15% or less by weight because it can typically be subjected to pyrolyzation without being dried. Green biomass, generally has a moisture content of about 50% by weight. Dry biomass generally has a moisture content of about 10% by weight. Green biomass can be blended with drier biomass to achieve a combined moisture content of fifteen percent or less. If blending the biomass is insufficient to achieve about 15% or less moisture content by weight, then the biomass is preferably dried prior to being pyrolyzed. Most preferably, the biomass subjected to pyrolysis has a moisture content of no more than about 12% by weight. In cases in which the biomass is too dry, moisture can be added.

As used here, the term "petroleum feedstock" means a material derived from petroleum that is used as a raw material to make an oil therefrom in the systems and methods of the invention. Petroleum feedstock includes but is not limited to petroleum-derived oils, liquids, greases, waxes, jellies, rubbers (including synthetic rubbers), recovered railroad cross ties, and the like. The petroleum feedstock may be supplied either in solid or liquid form. In preferred embodiments, the petroleum feedstock is a recycled material, such as ground rubber tires. The system and methods are particularly advantageous as they can use readily available materials that would otherwise be discarded for making the pyrolysis oil composition, thus providing a useful and environmentally friendly way to recycle these materials to make other valuable products from them.

A system aspect of the invention will now be described with reference to FIGS. 1-6, which generally illustrate several embodiments of the pyrolysis systems that may be used to produce the pyrolysis oil composition.

Referring first to FIG. 1, a pyrolysis system 10 for making the pyrolysis oil composition from biomass and petroleum feedstock includes a biomass pyrolysis stage 12, a petroleum feedstock vaporization stage 14, a vapor blending stage 16, a condensing stage 18, and a collecting stage 20.

In the biomass pyrolysis stage 12, the biomass is pyrolyzed to produce pyrolysis oil vapor, char, and non-condensing gases. The biomass is pyrolyzed by heating it substantially in the absence of oxygen to a temperature that is above the pyrolysis temperature of the particular type of biomass used. Selection of the appropriate temperature for pyrolyzing the biomass will depend on the biomass used and the pyrolysis conditions. A preferred temperature range for pyrolyzing the biomass is about 450 degrees C. to about 600 degrees C.

In the petroleum feedstock vaporization stage 14, the petroleum feedstock is vaporized by heating it to a temperature that is above the vaporization temperature of the particular petroleum feedstock used. Selection of the appropriate temperature for vaporizing the petroleum feedstock will depend on the petroleum feedstock used. A preferred temperature range for vaporizing the petroleum feedstock is about 450 degrees C. to about 600 degrees C. In some embodiments, the petroleum feedstock is vaporized via pyrolysis to generate a petroleum feedstock-derived pyrolysis oil.

The vapors produced during the biomass pyrolysis stage 12 and petroleum feedstock vaporization stage 14 travel along a vapor line 22 to the vapor blending stage 16 where the biomass-derived pyrolysis vapors and petroleum feedstock-derived vapors are blended while they are still in the vapor phase.

The blended biomass and petroleum feedstock-derived vapors then proceed to the condensing stage 18 by traveling along a blended vapor line 24. In the condensing stage 18, the temperature of the two vapors is reduced to a blend condensation temperature at which the blended biomass and petroleum feedstock-derived pyrolysis vapors will condense. This blend condensation temperature depends on the respective condensation temperatures of the vapors. Preferably, the blend condensation temperature is at or below the condensation temperature of the vapor having the lowest condensation temperature.

In some cases, pyrolyzing the biomass and vaporizing the petroleum feedstock will produce gases that do not condense during the condensing stage 18. These gases are referred to here as non-condensing gases. Non-condensing gases are removed from the condensing stage 18 via a non-condensing gases removal line 26 in gas flow communication with the condensing stage 18.

From the condensing stage 18, the condensate travels via a condensate line 28 to the collecting stage 20. In the collecting stage 20, the condensate is collected in a container for later use.

Figure 2:
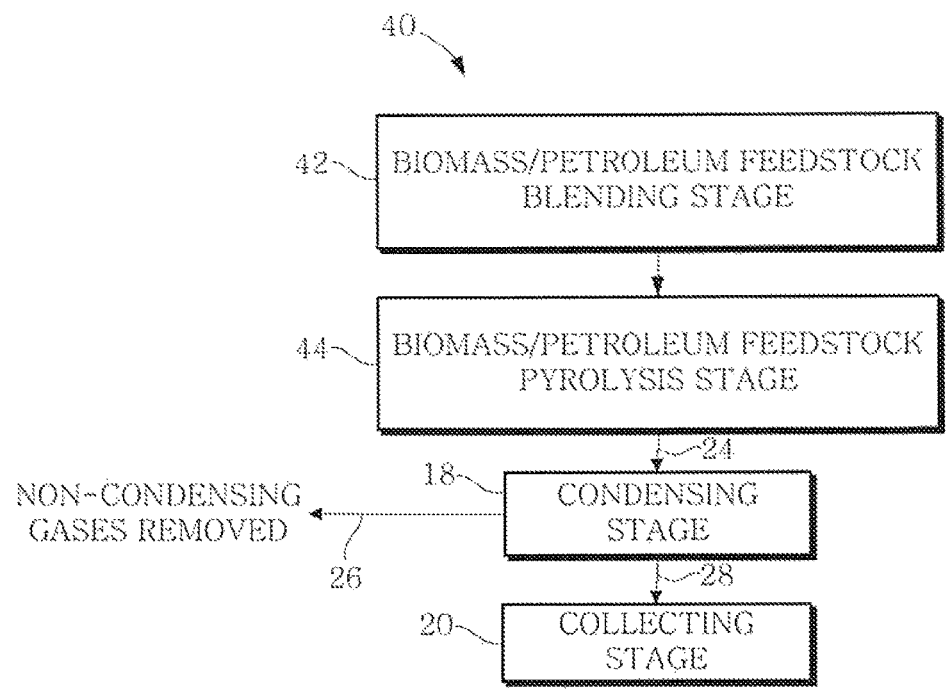
FIG. 2 is a schematic of a second pyrolysis system for producing the pyrolysis oil composition, according to an embodiment of the invention.

It is not necessary to pyrolyze the biomass and vaporize the petroleum feedstock in separate stages. In fact, as illustrated in FIG. 2, both materials may be combined prior to vaporization and then pyrolyzed together to produce the pyrolysis oil composition. Referring to FIG. 2, a more particular system 40 for making a pyrolysis oil composition from biomass and petroleum feedstock includes a biomass/petroleum feedstock blending stage 40, a biomass/petroleum feedstock co-pyrolysis stage 44, a condensing stag 18, and a collecting stage 20.

In the biomass/petroleum feedstock blending stage 42 the biomass and petroleum feedstock are combined together as raw materials prior to being pyrolyzed. Blending them together may be achieved simply by combining them in a container or by agitating them so that they become interdispersed with one another.

The combined biomass/petroleum feedstock blend from the biomass/petroleum feedstock blending stage 42 is then pyrolyzed in the biomass/petroleum feedstock pyrolysis stage 44 by heating the biomass/petroleum feedstock blend to an appropriate pyrolysis temperature substantially in the absence of oxygen. The pyrolysis temperature is a temperature that is at or above the pyrolysis temperature of the particular petroleum feedstock or biomass used. Selection of the appropriate temperature for pyrolyzing the materials will depend on the petroleum feedstock used, the biomass used, and the pyrolysis conditions. A preferred temperature range for pyrolyzing the biomass/petroleum feedstock blend is about 450 degrees C. to about 600 degrees C.

The pyrolysis vapors produced in the biomass/petroleum feedstock pyrolysis stage 44 then travel via a vapor line 24 to the condensing stage 18, from which the non-condensing gases are removed via the non-condensing gas removal line 26. The resulting pyrolysis oil then travels to the collecting stage 20 via the condensate line 28.

In certain cases, after the biomass and petroleum feedstock are pyrolyzed and the condensate is collected, it may be desirable to clean the pyrolysis unit(s) employed during the pyrolysis stage(s) of the systems of FIGS. 1 and 2 by removing the char and other pyrolysis byproducts. In such cases then, the pyrolysis system does not operate continuously. Larger volumes of the blended pyrolysis oil may be produced by a pyrolysis system that operates continuously.

Figure 3:
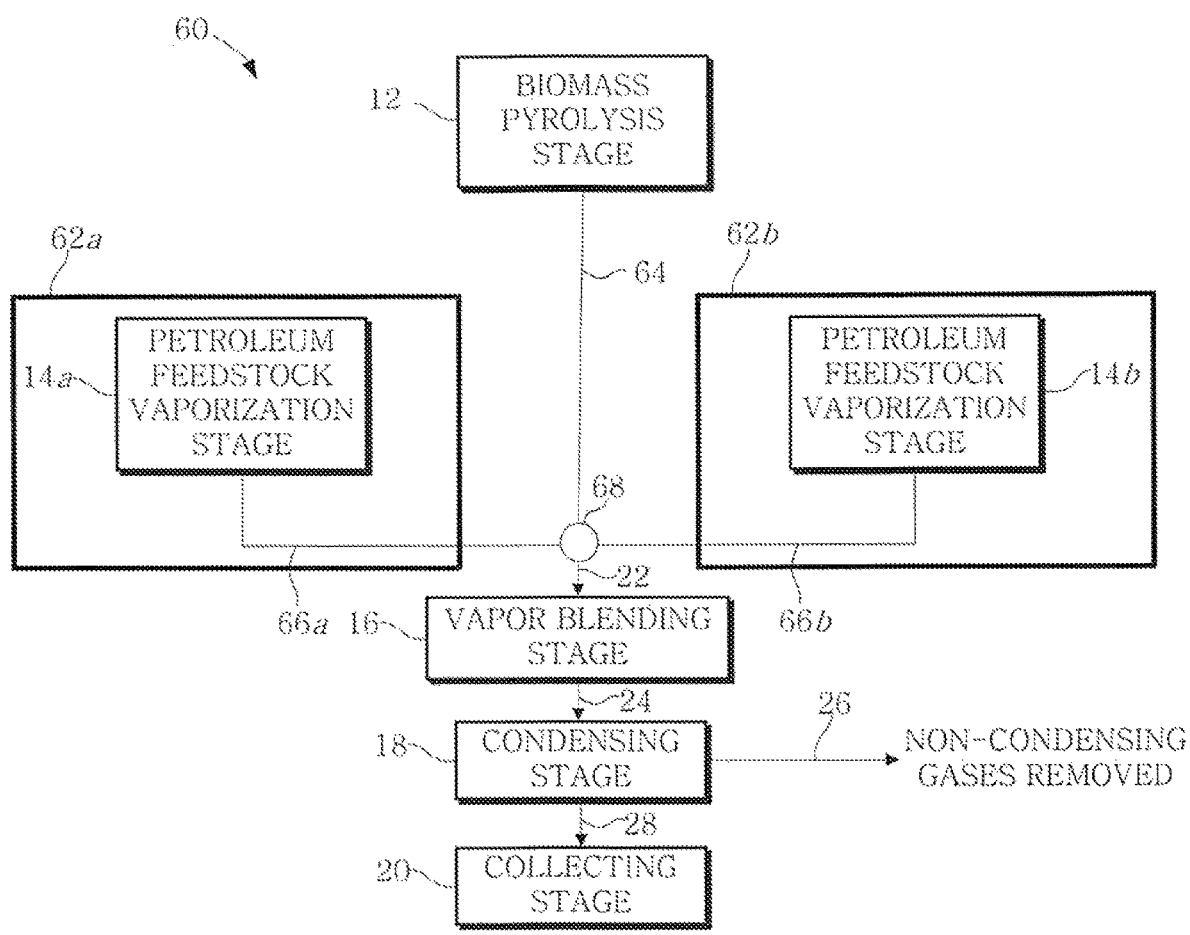
FIG. 3 is a schematic of a third pyrolysis system for producing the pyrolysis oil composition, according to an embodiment of the invention.

Such a continuous pyrolysis system 60 is generally illustrated in FIG. 3. In contrast to the pyrolysis system 10 shown in FIG. 1, the pyrolysis system 60 of FIG. 3 includes a first batch pyrolysis unit 62a and a second batch pyrolysis unit 62b. The first and second batch pyrolysis units 62a, 62b, respectively, include first and second petroleum feedstock vaporization stages 14a, 14b. The batch pyrolysis units 62a, 62b are configured to operate sequentially such that, when the first batch pyrolysis unit 62a is producing vapors the second batch pyrolysis unit 62b can be prepared to begin producing vapors and vice versa. This way, when vaporization of the petroleum feedstock is complete in one of the batch pyrolysis units 62a, 62b that batch pyrolysis unit 62a, 62b can be cleaned and recharged with new petroleum feedstock while the other batch pyrolysis unit 62a, 62b is in operation. By switching sequentially between batch pyrolysis units 62a, 62b in this manner, the pyrolysis system 60 can continuously produce petroleum feedstock-derived vapor. In the system 60 of FIG. 3, flow of vapors from the respective batch pyrolysis units 62a, 62b proceeds along first and second petroleum feedstock-derived vapor lines 66a, 66b to a flow control valve 68. The flow control valve 68 selectively opens the flow of vapors from the operational batch pyrolysis unit 62a. 62b and closes the flow of vapors from the other batch pyrolysis unit 62a, 62b.

Also in the system of FIG. 3, the biomass pyrolysis stage 12 is configured to receive a continuous flow of biomass so that it can continuously produce biomass-derived pyrolysis oil. The biomass derived pyrolysis oil produced at the biomass pyrolysis stage 12 flows through the biomass pyrolysis vapor line to the vapor blending stage 16 where it is combined with the petroleum-feedstock derived vapor.

The previously described pyrolysis stages are generally carried out in a pyrolysis chamber. The pyrolysis chamber is essentially a container that holds the biomass and/or petroleum feedstock during pyrolysis and is thermally coupled to a heat source capable of generating enough heat to pyrolyze the material therein. Suitable heat sources include a combustion heat sources such as a flame generated by combustion of hydrocarbon fuel, an electrically resistive heat source, or the like. Advantageously, when a combustion heat source is used, the combustion gases that result from combusting the fuel may be fed through the pyrolysis system to serve several functions: (a) the combustion gases assist with heating the material to be pyrolyzed and (b) the combustion gases act as an entrainment gas that help move the biomass from a storage unit to the biomass pyrolysis stage.

Figure 4:
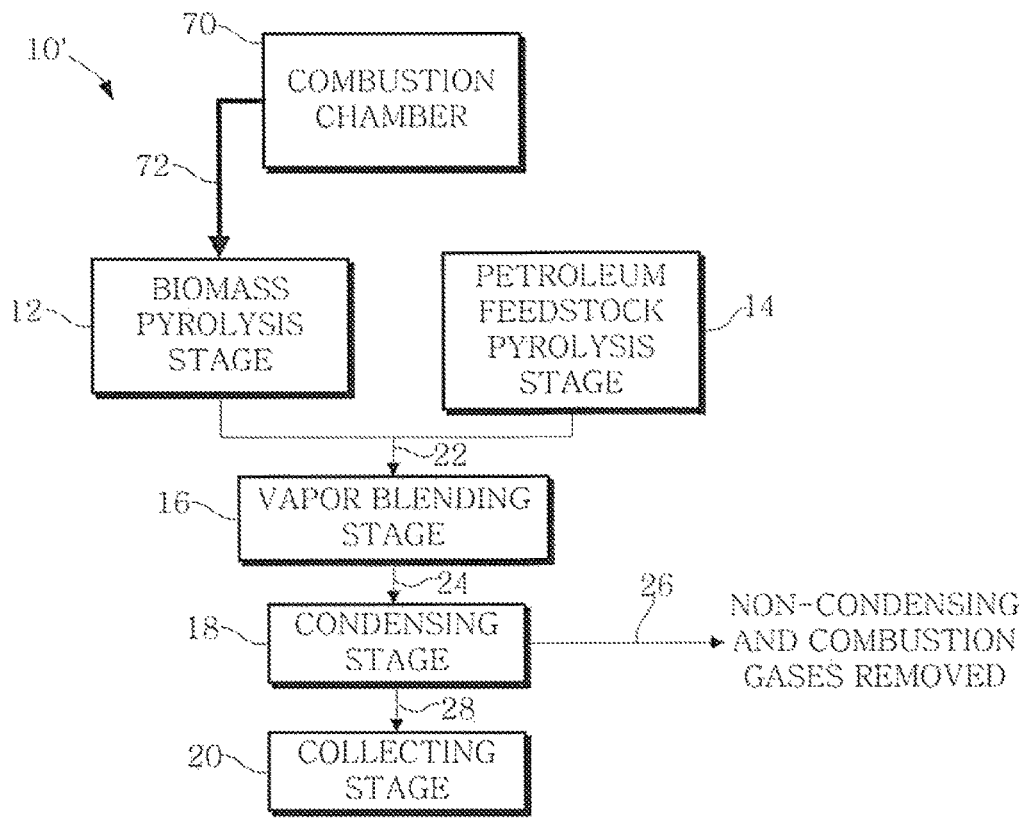
FIG. 4 is a schematic of a fourth pyrolysis system for producing the pyrolysis oil composition, according to an embodiment of the invention.
Figure 5:
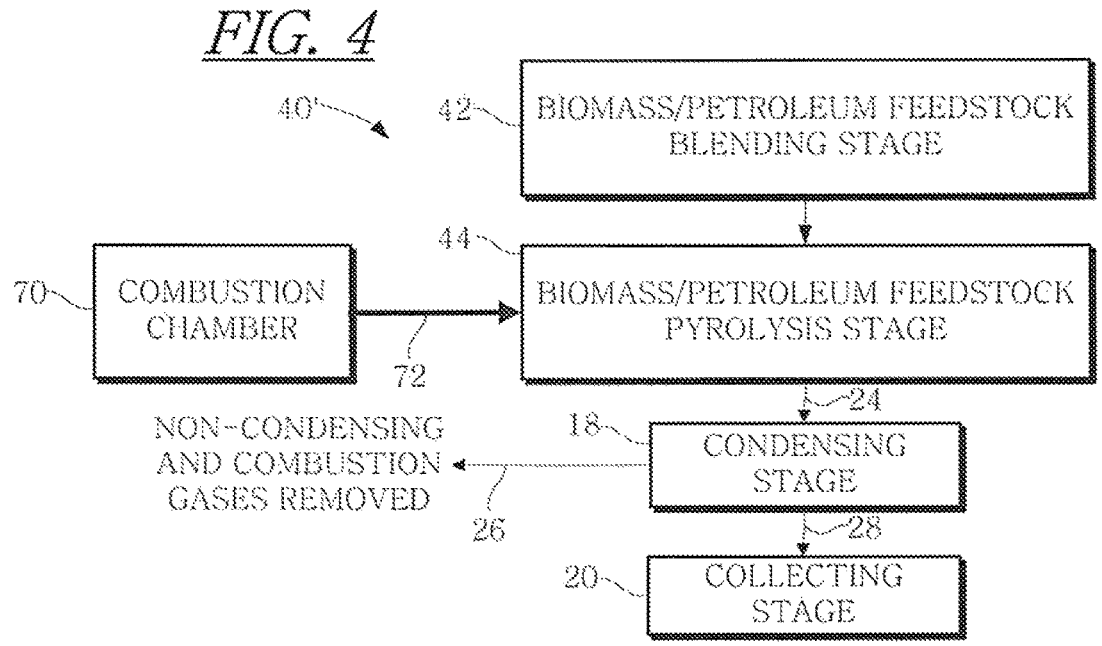
FIG. 5 is a schematic of a fifth pyrolysis system for producing the pyrolysis oil composition, according to an embodiment of the invention.
Figure 6:
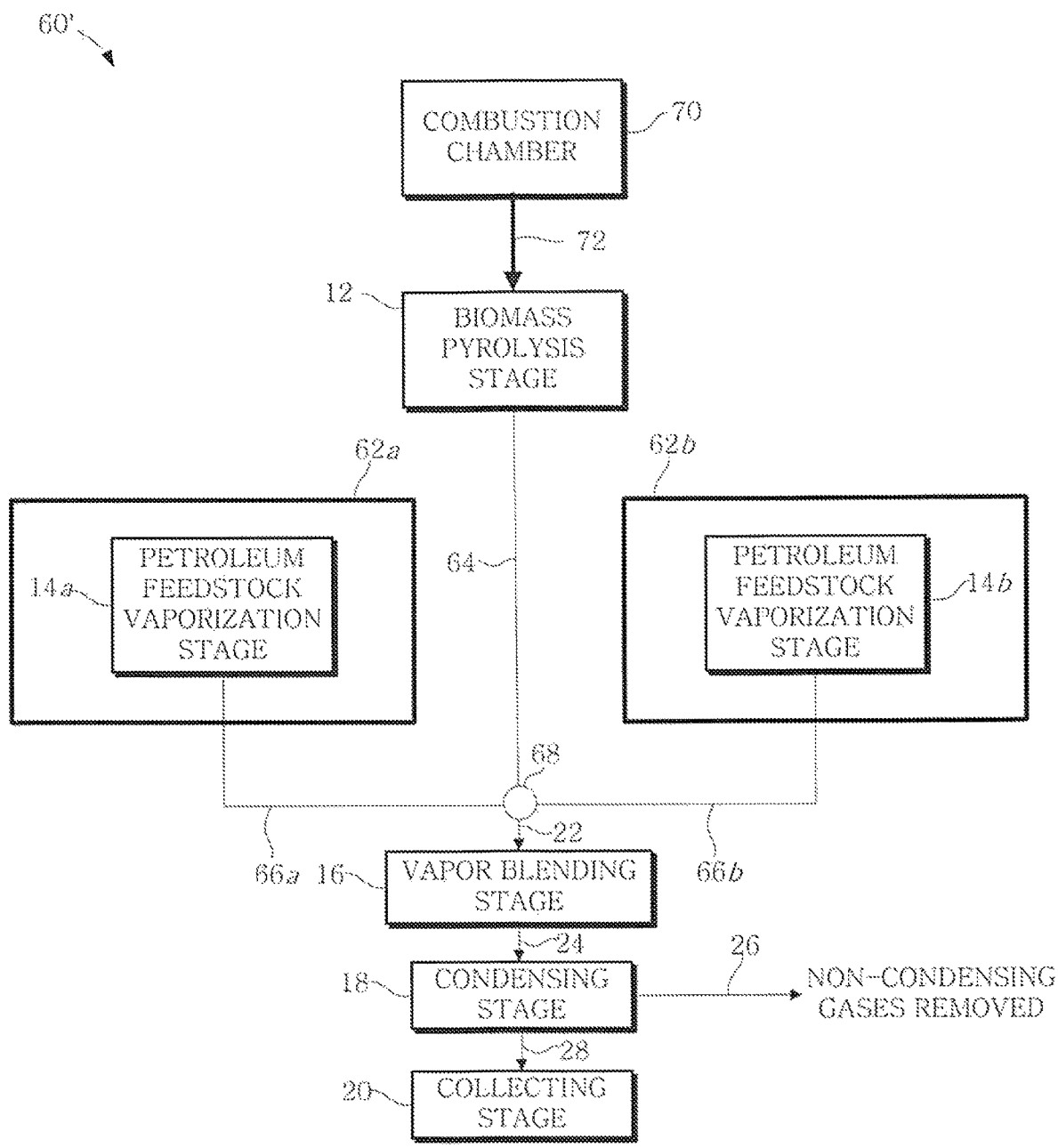
FIG. 6 is a schematic of a sixth pyrolysis system for producing the pyrolysis oil composition, according to an embodiment of the invention.

FIGS. 4-6 show examples of several preferred pyrolysis systems 10', 40', 60' that include the use of a combustion chamber 70 and advantageously use the combustion gases produced thereby as an entrainment gas for the biomass.

The pyrolysis system 10' of FIG. 4 is a modified version of the pyrolysis system 10 of FIG. 1, including a combustion chamber 70 that is thermally coupled to the biomass pyrolysis stage 12 and petroleum feedstock vaporization stage 14. When the combustion chamber 70 is operational, the combustion gases it produces are fed to the biomass pyrolysis stages 12 through one or more combustion gas feed lines 72. The combustion gases are exhausted from the system 10' with the non-condensing gases through the non-condensing gas removal line 26.

The pyrolysis system 40' of FIG. 5 is a modified version of the pyrolysis system 40 of FIG. 2, including a combustion chamber 70 that is thermally coupled to the biomass/petroleum feedstock pyrolysis stage 44. When the combustion chamber 70 is operational, the combustion gases it produces are fed to the biomass/petroleum feedstock pyrolysis stage 44 through one or more combustion gas feed lines 72. The combustion gases are exhausted from the system 40' with the non-condensing gases through the non-condensing gas removal line 26.

The pyrolysis system 60' of FIG. 6 is a modified version of the pyrolysis system 60 of FIG. 3, including a combustion chamber 70 thermally coupled to the biomass pyrolysis stage 12. When the combustion chamber 70 is operational, the combustion gases it produces are fed to the biomass pyrolysis stage 12 through a combustion gas feed line 72. The combustion gases are exhausted from the system 60' with the non-condensing gases through the non-condensing gas removal line 26. In some cases, it may be beneficial to use the hot combustion gases to pre-heat or apply additional heat to the combustion chamber by cycling the combustion gases back through the combustion chamber before they are vented. Accordingly, any of the previously described system can include a closed loop heat exchanger that functions in this manner.

In some cases, the pressure that is generated during the biomass pyrolysis stage is all the pressure that is needed to move the vapors to the condensing stage. In these cases, it is not necessary for the system to include pumps, fans, or external feed gas as flow enhancers. In other cases, however, it may be desirable to introduce an external gas flow to enhance the flow of the vapors to the condensing stage. Whether an external gas flow is needed depends on the arrangement and volume of the various stages and lines.

In the system aspects of the invention, when the term "line" is used in connection with a material moving therealong, this term refers to a gas flow conduit such as piping, tubing, or the like.

In the condensing stage 18, there are various ways that condensing can be achieved. These include conventional condensation techniques such as passing the vapors through a cooled chamber or bubbling the vapors through a liquid.

There are many different types of conventional pyrolysis systems that those skilled in the art can adapt to make the pyrolysis oil composition after having the benefit of reading this disclosure. One such system is described in U.S. Pat. No. 8,206,471, which is incorporated by reference in its entirety.

Preferably, but not necessarily, the pyrolysis system is adapted to be mobile so that it can be moved to location proximal to a wood processing facility so that scrap wood products can easily be transported thereto.

The method aspects of the invention will now described in more detail with reference to FIGS. 7-9, which generally illustrate several embodiments of the process of producing the pyrolysis oil composition.

Figure 7:
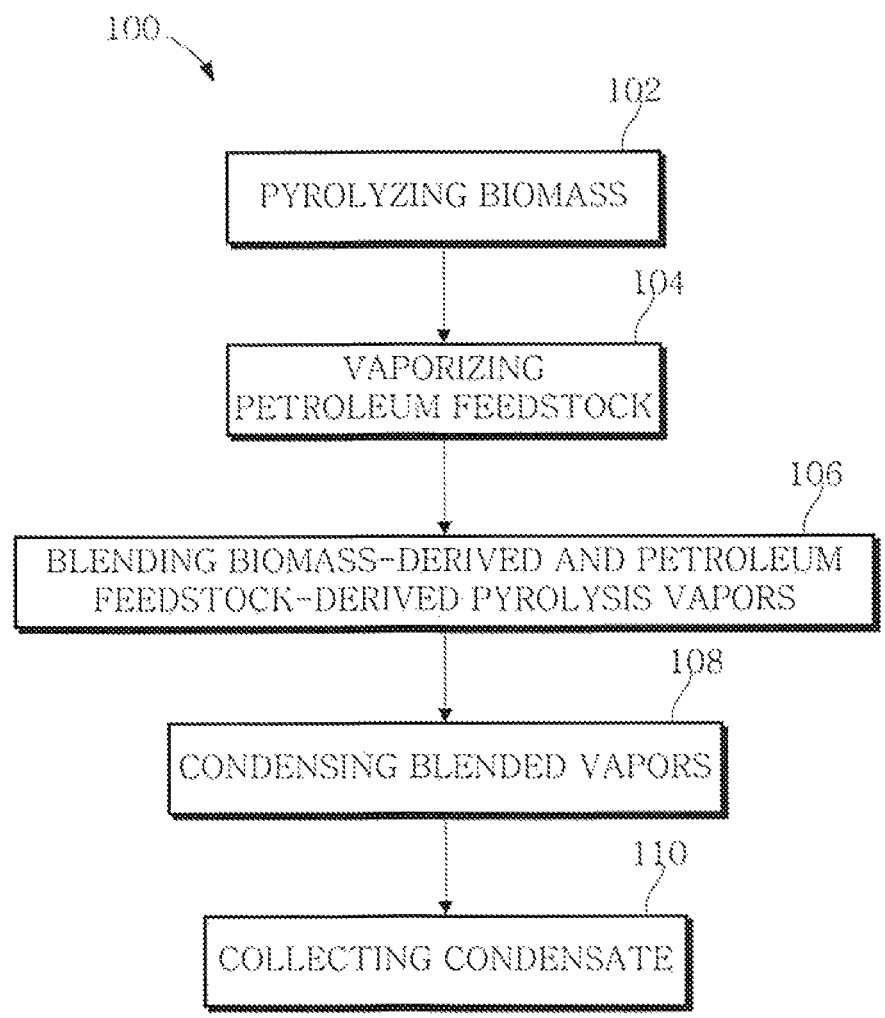
FIG. 7 is a flow diagram of a first process of making a pyrolysis oil composition, according to an embodiment of the invention.

Referring to FIG. 7, a process for making a pyrolysis oil composition 100 involves pyrolyzing biomass to generate biomass-derived pyrolysis vapor therefrom (block 102), vaporizing petroleum feedstock to generate petroleum feedstock-derived vapor therefrom (block 104), blending the biomass-derived pyrolysis vapor and petroleum feedstock-derived vapor together (block 106), condensing the blended biomass-derived pyrolysis vapor and petroleum feedstock-derived vapor simultaneously to form a condensate (block 108), and collecting the condensate (block 110).

Figure 8:
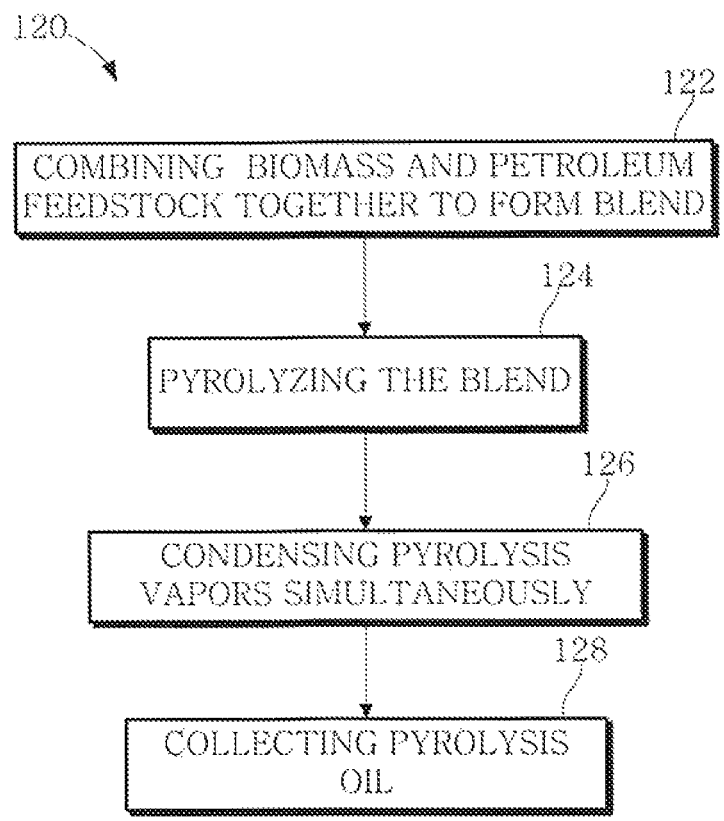
FIG. 8 is a flow diagram of a second process of making a pyrolysis oil composition, according to an embodiment of the invention.

Referring to FIG. 8, another process for making a pyrolysis oil composition 120 involves combining biomass and petroleum feedstock together to form a biomass/petroleum feedstock blend (block 122), pyrolyzing the biomass/petroleum feedstock blend to generate biomass-derived pyrolysis vapor and petroleum feedstock derived pyrolysis vapor (block 124), condensing the generated biomass-derived pyrolysis vapor and petroleum feedstock derived pyrolysis vapor simultaneously to form the pyrolysis oil composition (block 126), and collecting the pyrolysis oil composition (block 128).

In situations in which is desirable to produce a large volume of the pyrolysis oil composition it may be desirable to use a method that allows for continuous production of the product by sequentially cycling between a plurality of batch pyrolysis units in which petroleum feedstock is vaporized. In this manner, when a batch pyrolysis unit ceases to produce petroleum feedstock-derived vapor, it can be taken off-line and recharged with fresh petroleum feedstock while a different batch pyrolysis unit is generating petroleum feedstock-derived vapors.

Figure 9:
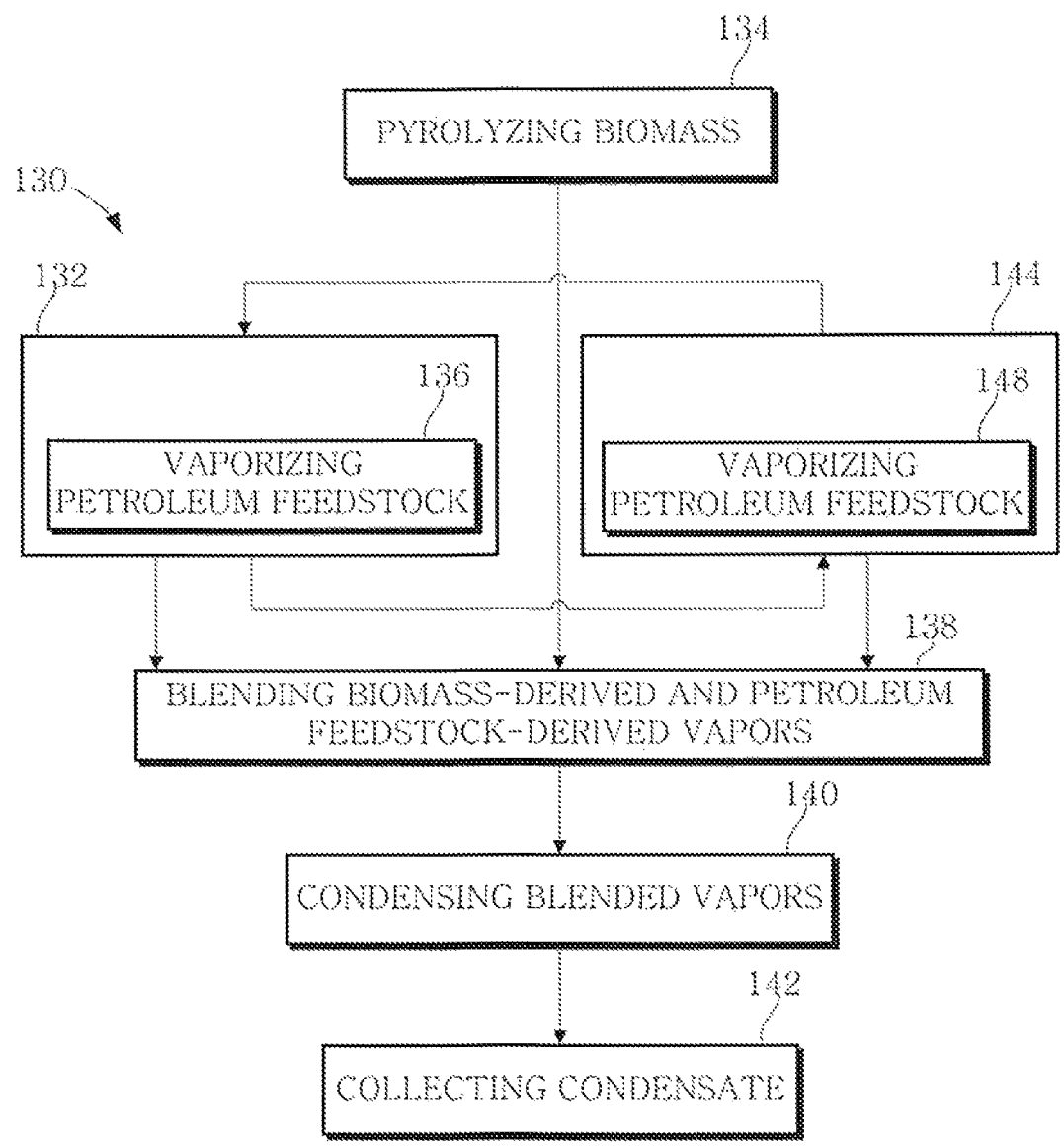
FIG. 9 is a flow diagram of a third process of making a pyrolysis oil composition, according to an embodiment of the invention.

Referring to FIG. 9, such a continuous process of making a pyrolysis oil composition involves introducing a continuous feed of biomass into a biomass pyrolysis unit and pyrolyzing biomass to produce a stream of biomass-derived pyrolysis vapor (Block 134). The process continues by producing petroleum feedstock-derived vapor by vaporizing petroleum feedstock in a first batch pyrolysis unit 132 (Block 136), feeding the petroleum feedstock-derived vapor into the stream of biomass derived pyrolysis vapor, blending the biomass-derived pyrolysis vapor and petroleum feedstock-derived vapor together (Block 138), condensing the blended biomass-derived pyrolysis vapor and petroleum feedstock-derived vapor simultaneously to form a condensate (Block 140); and collecting the condensate (Block 142). The process also involves producing petroleum feedstock-derived vapor by vaporizing petroleum feedstock in a second batch pyrolysis unit 144 (Block 148), feeding the petroleum feedstock-derived vapor into the stream of biomass derived pyrolysis vapor, blending the biomass-derived pyrolysis vapor and petroleum feedstock-derived vapor together (Block 138), condensing the blended biomass-derived pyrolysis vapor and petroleum feedstock-derived vapor simultaneously to form a condensate (Block 140), and collecting the condensate (Block 142). In this process, the first and second pyrolysis batch units 132, 144 perform the pyrolyzing steps sequentially in such a way that, when the first pyrolysis batch unit is pyrolyzing, the second pyrolysis batch unit can be charged with petroleum feedstock.

This particular method is particularly advantageous to reduce the amount of effort needed to produce the pyrolysis oil composition because the biomass is often ready to be fed into a continuous pyrolysis stage, but items tires or railroad cross ties are not. Specifically, tires and cross ties have a significant amount of material that is not desirable and is also difficult to remove, such as steel beads, steel radial mesh, sand, steel split forms, among others. These materials that are more difficult to process are vaporized in a batch pyrolysis unit and the non-desirable materials are removed from the char after pyrolysis and recovered for salvage value. This process will thereby reduce the energy and labor to process tires and railroad cross ties.

The methods illustrated in FIGS. 7-9 may be performed using any of the systems illustrated in FIGS. 1-6. It should be understood, however, that these particular pyrolysis systems may not be the only pyrolysis systems that can be used to perform these methods. In fact, most conventional pyrolysis systems could be adapted to perform these methods.

It should be understood that, for both the systems and the methods, that petroleum feedstock does not need to be vaporized using heat. Instead, it can be vaporized by forming an atomized mist which is then injected at or prior to the vapor blending stage or step. In order to form the pyrolysis oil composition, however, it is noteworthy that the petroleum feedstock-derived vapor should be blended with the biomass-derived pyrolysis vapor so that the two vapors can condense simultaneously.

The invention has been described above with reference to preferred embodiments. Unless otherwise defined, all technical and scientific terms used herein are intended to have the same meaning as commonly understood in the art to which this invention pertains and at the time of its filing. Although various methods and materials similar or equivalent to those described herein can be used in the practice or testing of the present invention, suitable methods and materials are described. However, the skilled should understand that the methods and materials used and described are examples and may not be the only ones suitable for use in the invention.

The invention has been described in some detail, but it will be apparent that various modifications and changes can be made within the spirit and scope of the invention as described in the foregoing specification and the appended claims.

That which is claimed is:

1. A pyrolysis oil composition consisting of a mixture of only:

non-upgraded biomass-derived pyrolysis oil; and
petroleum feedstock-derived oil;
wherein the non-upgraded biomass-derived pyrolysis oil and the petroleum feedstock-derived oil coexist blended together in the liquid phase;
wherein the mixture is static.

2. The condensate of claim 1, wherein the petroleum feedstock comprises rubber, railroad cross tie material, or a combination thereof.

3. The pyrolysis oil composition of claim 1, wherein the biomass comprises cellulosic material.

4. The pyrolysis oil composition of claim 1, wherein the biomass comprises wood.

* * * * *